No. 863,806. PATENTED AUG. 20, 1907.
H. L. RUTLEDGE.
TIRE TIGHTENER.
APPLICATION FILED OCT. 18, 1906.

Inventor
H. L. Rutledge

Witnesses
G. R. Thomas
J. W. Quinn

By Chandler & Chandler
Attorneys

UNITED STATES PATENT OFFICE.

HENRY L. RUTLEDGE, OF LAMAR, LOUISIANA.

TIRE-TIGHTENER.

No. 863,806.	Specification of Letters Patent.	Patented Aug. 20, 1907.

Application filed October 18, 1906. Serial No. 339,547.

*To all whom it may concern:*

Be it known that I, HENRY L. RUTLEDGE, a citizen of the United States, residing at Lamar, in the county of Franklin, State of Louisiana, have invented certain new and useful Improvements in Tire-Tighteners; and I do hereby declare the following to be a full, clear, and exact description of the invention, such as will enable others skilled in the art to which it appertains to make and use the same.

This invention has relation to adjustable spokes for vehicle wheels for the purpose of expanding the felly when the tire becomes loosened, and by the said expansion of the felly or rim, tighten the tire on the latter.

The nature of the invention embodies, *inter alia*, a dowel-joint connecting the outer end of the spoke with the felly or rim, a divided sleeve on a reduced part of the spoke which sleeve is externally screw-threaded on the borders of its dividing line to receive thereon a turn buckle to adjust the outer portion of the sleeve longitudinally on the spoke, which portion of the sleeve is provided with an iron shoe bearing against the inner face of the felly and secured thereto by screws in its ends.

The improvements indicated are shown as embodied in the device portrayed in the annexed drawings, forming a part of this specification, in view of which the invention will first be described in detail, and then pointed out in the subjoined claims.

Figure 1:
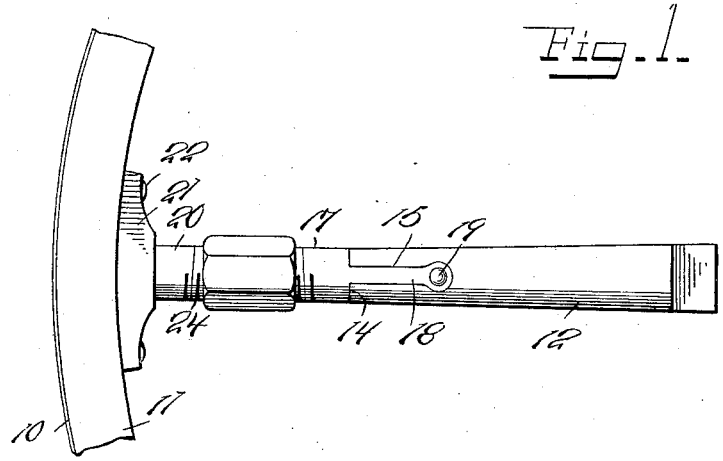
Figure 2:
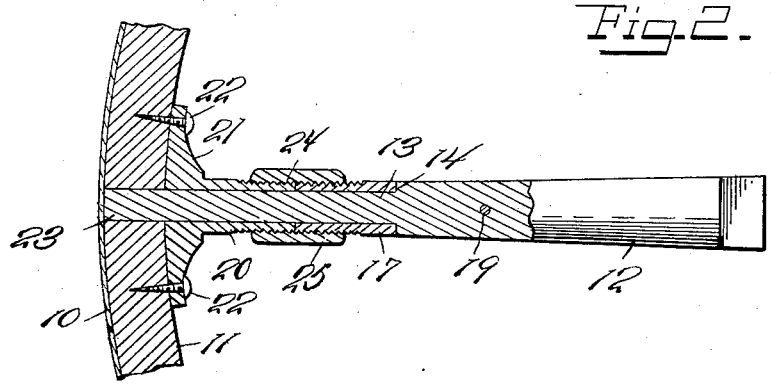
Figure 3:
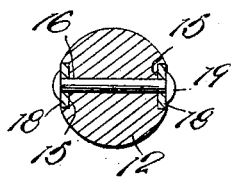

Of the said drawings—Figure 1 is a side elevation. Fig. 2 is a longitudinal section. Fig. 3 is a transverse section through the means connecting the lower portion of the sleeve with the spoke.

Similar numerals of reference designate similar parts or features, as the case may be, wherever they occur.

In the drawings—10 designates the tire; 11, the felly or rim; and, 12, the spoke. The latter is constructed at its inner end, so as to be connected with the hub (not shown) in any known or suitable manner.

13 designates the outer portion of the spoke, which is reduced in diameter, resulting in the formation of a shoulder, 14, at the inner extremity of the reduced portion; and extending inward from the said shoulder on opposite sides of the spoke, are longitudinal grooves 15, near the extremities of which a hole, 16, is made laterally through the spoke. A divided sleeve is arranged on the reduced end of the spoke and the inner portion 17 of said sleeve is provided with inwardly projecting tongues 18 extending from its inner end, which tongues are constructed to fit in the grooves 15 of the spoke, and have their inner ends perforated to receive a pin, 19, which is also projected through the hole 16 and riveted at its ends to hold the portion 17 of the sleeve in fixed position on the spoke.

20 designates the outer portion of the sleeve which is arranged on the outer end of the reduced portion of the spoke, and has a metallic shoe, 21, secured on its outer end, which shoe is adapted to bear against the inner face of the felly and has perforations formed through its ends, through which the shanks of screws 22 may extend and be tapped into the felly to secure the shoe thereto. The end, 23, of the spoke extends beyond the outer face of the shoe in the nature of a dowel-pin which is fitted into a hole in the felly to form the usual dowel-joint between the spoke and felly. The margins 24 of the sleeve portions 17 and 20 are externally screw-threaded to receive thereon a turn-buckle, 25, by the operation of which the outer portion 20 of the sleeve may be moved outward on the spoke, carrying its attached shoe 21 with it, or be drawn inward, drawing the shoe in the same direction. The inner portion 17 of the divided sleeve by reason of its specified connection with the spoke will be held from either turning axially of the spoke or moving longitudinally thereon. It will now be seen that should the tire become loose on the rim or felly, by adjusting the shoe 21 outward through the medium of the turn-buckle and its connections, the felly will be expanded and the tire tightened without loosening the dowel-joint connecting the spoke with the felly.

It is obvious that changes may be made in the form and arrangement of parts and features of the invention without departing from the general nature and spirit of the improvements set forth.

What is claimed is—

A spoke for vehicle wheels having its outer portion reduced in diameter, a divided sleeve on said reduced portion having the outer side of the margins adjacent to the meeting lines screw-threaded, a turn-buckle secured on the screw-threaded portions, the inner part of the divided sleeve being secured on the spoke to keep it from turning or moving longitudinally thereon, and a metallic shoe secured on the outer end of the outer portion of the sleeve, the said shoe being provided with perforations on its ends, and the spoke extending beyond the outer face of the shoe in the nature of a dowel-pin.

In testimony whereof, I affix my signature, in presence of two witnesses.

HENRY L. RUTLEDGE.

Witnesses:
D. S. MYERS.
JOS. B. COXRIEL.